(12) United States Patent
Lindberg

(10) Patent No.: US 7,406,669 B2
(45) Date of Patent: Jul. 29, 2008

(54) TIMING CONSTRAINTS METHODOLOGY FOR ENABLING CLOCK RECONVERGENCE PESSIMISM REMOVAL IN EXTRACTED TIMING MODELS

(75) Inventor: Peter F. Lindberg, Minneapolis, MN (US)

(73) Assignee: LSI Corporation, Milpitas, CA (US)

( * ) Notice: Subject to any disclaimer, the term of this patent is extended or adjusted under 35 U.S.C. 154(b) by 262 days.

(21) Appl. No.: 11/295,351

(22) Filed: Dec. 6, 2005

(65) Prior Publication Data
US 2007/0130486 A1   Jun. 7, 2007

(51) Int. Cl.
*G06F 17/50* (2006.01)
(52) U.S. Cl. .............. 716/3; 716/6; 716/12; 716/18
(58) Field of Classification Search ............ 716/3, 716/6, 12, 18
See application file for complete search history.

(56) References Cited

U.S. PATENT DOCUMENTS 7,278,126 B2 * 10/2007 Sun et al. .................. 716/6
2002/0073389 A1 * 6/2002 Elboim et al. ............. 716/6

* cited by examiner

*Primary Examiner*—Thuan Do
(74) *Attorney, Agent, or Firm*—Suiter Swantz PC LLO

(57) ABSTRACT

A method of enabling CRPR in an ETM. In an exemplary embodiment, the method includes locating a plurality of clocks defined within a core. The method may also include determining if one of the plurality of clocks are clocking data both within the core and outside of the core. A CRPR clock for an output pin of a last cell in a clock path common to an internal register clock pin and one of the plurality of clocks clocking data clocking data both within the core and outside of the core may be defined. A static timing analysis tool may be employed to calculate the CRPR from the CRPR clock.

13 Claims, 3 Drawing Sheets

TIMING CONSTRAINTS METHODOLOGY FOR ENABLING CLOCK RECONVERGENCE PESSIMISM REMOVAL IN EXTRACTED TIMING MODELS

FIELD OF THE INVENTION

The present invention relates to the field of integrated circuit design and more particularly, to a method for enabling clock reconvergence pessimism removal (CRPR) in extracted timing models (ETMs) such as CoreWare® intellectual property (IP) ETMs (CoreWare® is a trademark registered to LSI Logic, Milpitas, Calif.).

BACKGROUND OF THE INVENTION

The main issue which continues to plague integrated circuit design including system-on-a-chip (SoC) technologies is timing. In order to address the issue of timing, a number of different static timing analysis tools including Primetime® (Primetime® is a trademark registered to SYNOPSYS) have been developed. Primetime® is a full-chip, gate-level static timing analysis tool which is capable of analyzing millions of gates in a short time period and thus, allowing multiple analysis runs in a given day. A static timing analysis tool such as Primetime® analyzes timing errors and noise due to crosstalk as well as IR drop with complex clocking schemes including gated clocks. Further, a static timing analysis tool may include a timing model extraction feature which may be used to increase designer productivity by reducing analysis runtime and memory usage. For example, Primetime® includes a timing model extraction feature that automatically generates a high-level model from a gate-level netlist. In addition, static timing analysis tools may support CRPR in order to remove artificially-induced pessimism from a timing report between a launching and capturing device. Typically, CRPR is most applicable in the on-chip variation (OCV) mode which is the mode associated with the greatest timing variations. In the absence of CRPR, the actual timing properties of a circuit may be skewed by delay variation in clock networks and thus, led to the belief that the circuit may operate at a lower frequency than the actual silicon implementation.

Although present static timing analysis tools have improved integrated circuit performance, such systems are limited under certain circumstances. For example, it is often problematic to get the ETMs to match the timing of the gate level netlist. The ETM may be a timing abstraction which hides the gate level netlist from the customer. However, such configuration also results in a loss in information including information regarding the exact clock delay of a path versus a data delay.

Therefore, it would be desirable to provide a method for enabling clock CRPR in ETMs which overcomes the aforementioned limitations associated with the present methods for CRPR.

SUMMARY OF THE INVENTION

The present invention is directed to a method of enabling CRPR in an ETM. In an aspect of the present invention, the method includes locating a plurality of clocks defined within a core. The method may also include determining if one of the plurality of clocks are clocking data both within the core and outside of the core. A clock may be generated for an output pin of a last cell in a clock path common to an internal register clock pin and one of the plurality of clocks clocking data both within the core and outside of the core may be defined. A static timing analysis tool may be employed to calculate the CRPR from the clock delay information.

In a further aspect of the present invention, a method for enabling CRPR in an ETM is provided. The method may include utilizing at least two registers which share a common clock tree. The method may also include connecting a clock source to the at least two registers for creating a clock path between the at least two registers. An internal clock may be utilized to generate a timing arc clock path that is common to the at least two registers. For example, the timing arc may include clock information. In addition, the method may include employing a static timing analysis tool to calculate CRPR from clock information included within the timing arc.

In an additional aspect of the present invention, a computer-readable medium having computer-executable instructions for performing a method for enabling clock reconvergence pessimism removal (CRPR) in an extracted timing model (ETM) is provided. The method may include the following: locating a plurality of clocks defined within a core; determining if one of the plurality of clocks are clocking data both within the core and outside of the core; generating a clock for an output pin of a last cell in a clock path common to an internal register clock pin and one of the plurality of clocks clocking data both within the core and outside of the core; and utilizing a static timing analysis tool to calculate the CRPR from the clock delay information.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. It is to be appreciated that corresponding reference numbers refer to generally corresponding structures.

Figure 1:
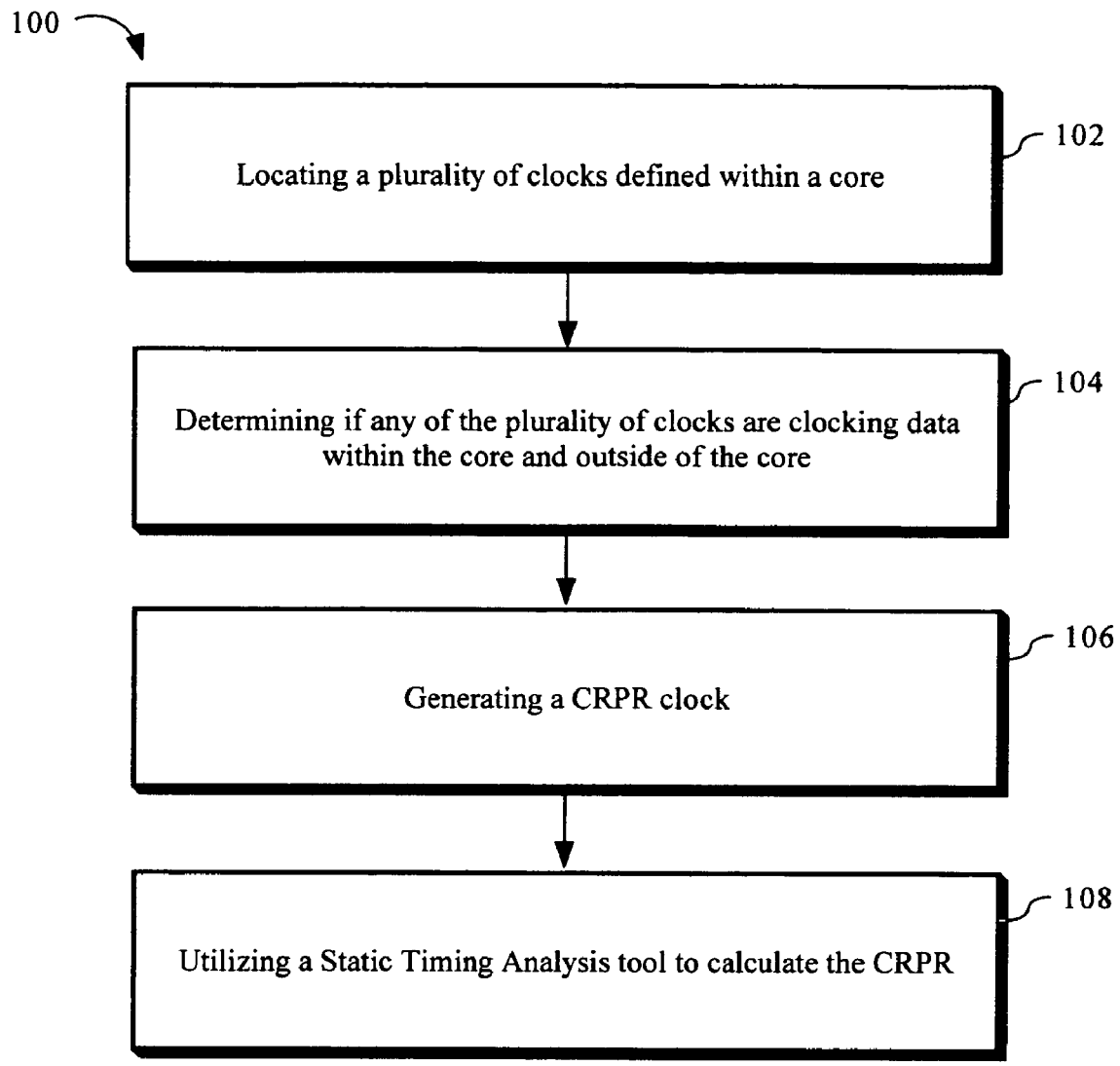
FIG. 1 is a flow diagram of a method for enabling CRPR in ETMs in accordance with an exemplary embodiment of the present invention.

Referring to FIG. 1, a method 100 for enabling CRPR in ETMs is provided. In an exemplary embodiment of the present invention, the method 100 of enabling CRPR in ETMs includes locating a plurality of clocks defined within a core 102. In an embodiment, the core is a fully defined, optimized, and reusable block of logic which supports industry-standard functions and has predefined timing and layout. The method may also include determining if any of the plurality of clocks are clocking data both within the core and outside of the core 104. In addition, the method 100 may include generating a CRPR clock 106. For instance, the CRPR clock may be defined on an output pin of a last cell in a clock path common to an internal register clock pin and one of the plurality of clocks clocking data clocking data both within the core and outside of the core. In order to calculate the CRPR, the method 100 may involve utilizing a static timing analysis tool. For instance, a gate-level static timing analysis tool such as Primetime® may be employed.

In an advantageous embodiment, the method 100 is for enabling CRPR in ETMs in Coreware® Intellectual Property (IP). In such embodiment, the method 100 allows the Coreware® IP ETM to more closely match the gate-level implementation (e.g., the netlist) of the Coreware® IP, therefore enhancing the likelihood of closing timing on user-specific Coreware® designs. In the present embodiment, the locating of clocks defined within a core 102 may include locating all clocks defined for the Coreware®. Determining if any of the plurality of clocks are clocking data within the core and outside of the core 104 may include determining if there are any clocks that are clocking data inside of the Coreware® and also exiting the core to clock other registers outside of the Coreware® by first connecting input pins with input ports and output pins with output ports. Such connections may be accomplished by utilizing either a real chip design or a hand-created testcase. The determination of the clock status may also include ensuring that the Coreware® IP is using the full gate level netlist (not the ETM model) and defining standard time constraints for the Coreware® IP as well as chip level constraints in order to ensure that the clocks are defined. In addition, such determination may involve applying global timing derating and activating the CRPR algorithm by using variables defined within a static timing analysis tool. For example, global timing derating may be applied by utilizing the Primetime® variable "set_timing_derate" and a CRPR algorithm may be activated by "set timing_remove_clock_reconvergence_pessimism true." Moreover, a timing report on each of the output ports may be generated and then, subsequently searched (e.g., by use of global regular expression print) for "clock reconvergence pessimism." A data port on which CRPR is being used is one in which was detected by the search to be non-zero. A clock path associated with such clock and data port may be employed in generating a CRPR clock as described below because such clock path includes clock cells or nets with the given data path.

In addition, generating a CRPR clock 106 in a Coreware® IP environment may include generating a clock on the output pin of the last cell in the clock path that is common with the internal register clock pin and the clock going outside of the Coreware®. For instance, the command may be "create_generated_clock" and be a "divide_by 1" clock that will use the hard macro input clock pin as a master clock. In a further embodiment, an invert switch may need to be utilized if an inverter is part of the common clock cells. In an advantageous embodiment, the name of the newly generated CRPR clock is similar to that of the master clock to further instill the function of the newly CRPR generated clock. Exemplary code for naming the newly generated clock may be "create_generated_clock-name SYSCLK_CRPR_CLK -divide_by 1 -source [get_pins u_core/SYSCLK][get_pins u_core/u_buf1/Z]." The clock command creatomg a CRPR clock allows the clock delay information to be separated from the data delay information allowing a static timing analysis tool to use the information in the CRPR calculation. In an embodiment, the static timing analysis tool is a gate-level static timing analysis tool such as Primetime®. In an advantageous embodiment, when generating a CRPR clock on an output pin of a last cell in a clock path common to an internal register clock pin and one of the plurality of clocks clocking data both within the core and outside of the core 106, the clock going out of the Coreware® is used to capture data coming from the same Coreware® clocked by the same clock. Further, in such embodiment, the data path and the clock path share common cells or nets.

Figure 2:
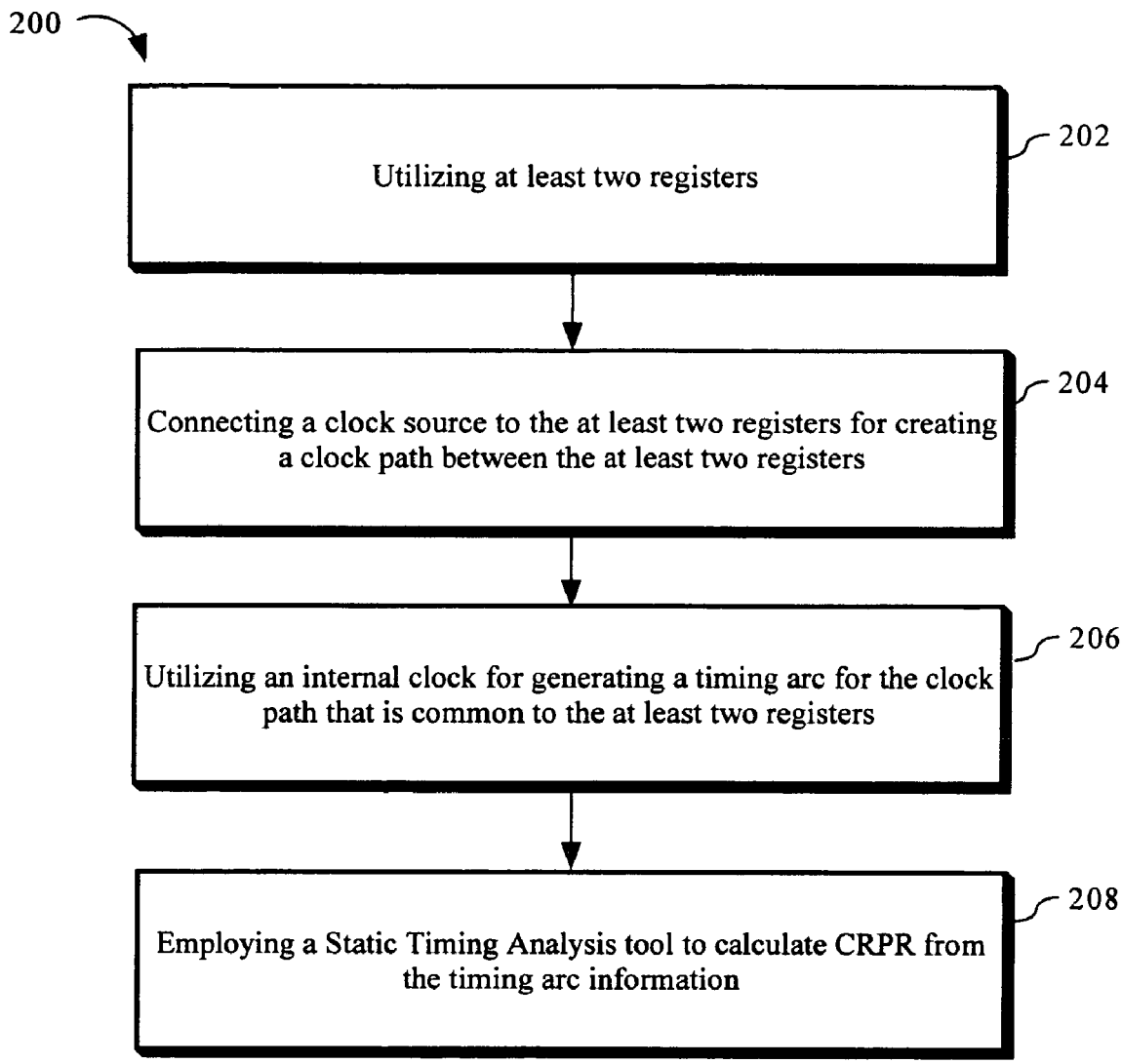
FIG. 2 is flow diagram of an additional method for enabling CRPR in ETMs in accordance with an exemplary embodiment of the present invention.

Referring to FIG. 2, a method 200 for enabling CRPR in ETMs is disclosed. In general, CRPR may be used when a path between two registers is on the same clock tree and the clock tree that clocks the clock pins of these registers share one or more of the same nets/cells. In an embodiment, the degree of sharing between the clock tree and the two registers is inversely proportional to the amount of clock skew in which as the degree of sharing increases, clock skew decreases. In such embodiment, the net/cell delays may be expressed in triplet format (e.g., min/typ/max) and coupled with the on_chip_variation analysis style of static timing analysis used, the same net/cell on the clock source path and clock destination path possibly including two different delays at the same point in time. CRPR is used to find the delta between these two different delays.

In an exemplary embodiment of the present invention, as illustrated in FIG. 2, the method 200 may include a utilizing at least two registers 202. For instance, the at least two registers share a common clock tree. The method 200 may also include connecting a clock source to the at least two registers for creating a clock path between the at least two registers 204. It is contemplated that the clock source may be located within the core or outside of the core. In an additional embodiment, the method 200 includes utilizing an internal clock to generate a timing arc for the timing path that is common to the at least two registers 206 in which the timing arc includes clock information. 206. In an advantageous embodiment, the internal clock is created off of a register Q pin. In addition, the method 200 may include employing a static timing analysis tool to calculate CRPR from clock information included within the timing arc 208. For example, the static timing analysis tool is a gate-level static timing analysis tool such as Primetime®. It is contemplated that the method 200 for enabling CRPR may be performed through Coreware® Intellectual Property (IP).

Figure 3:
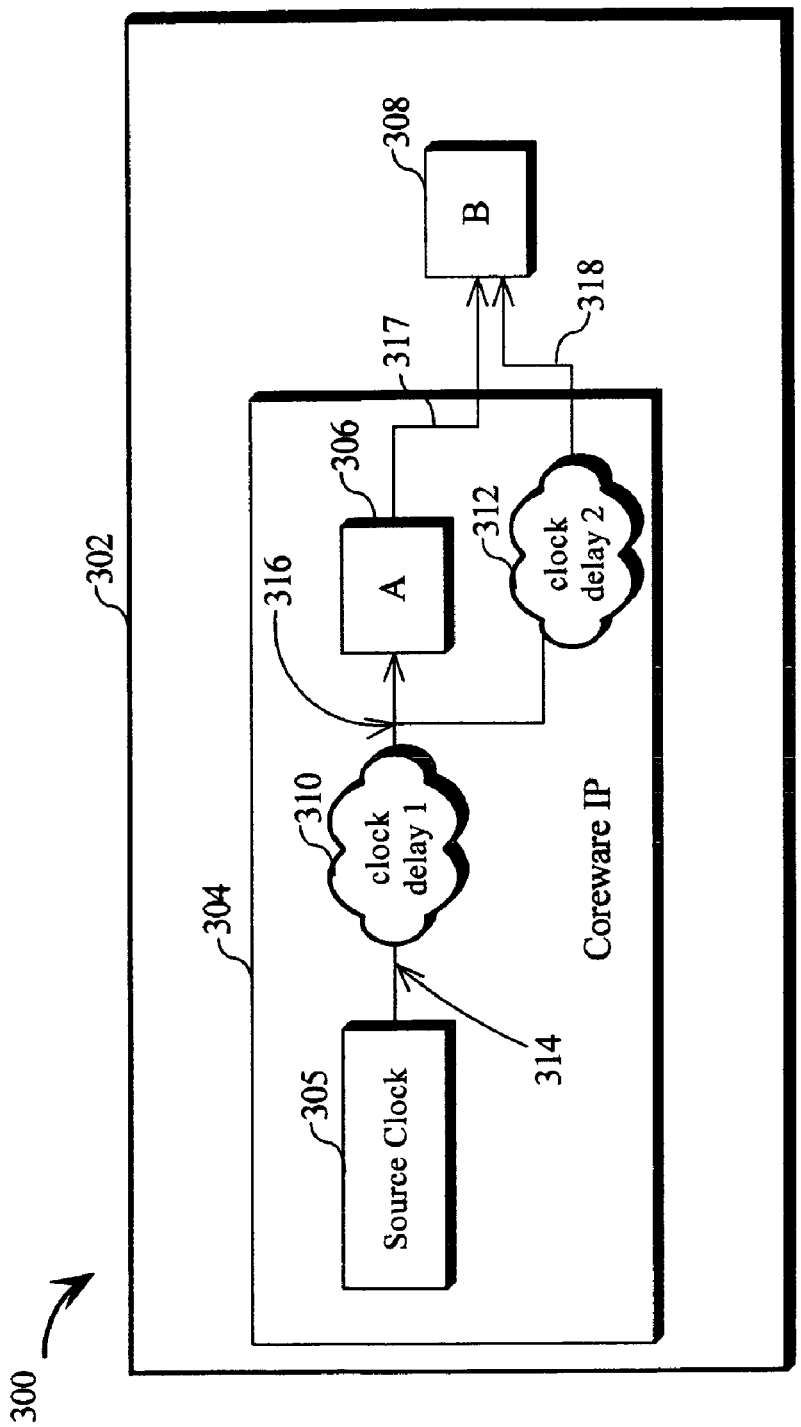
FIG. 3 is a schematic diagram of clock reconvergence pessimism removal in accordance with an exemplary embodiment of the present invention.

Referring to FIG. 3, an exemplary embodiment 300 of clock reconvergence pessimism removal in accordance with the present invention is provided. In an embodiment, the chip 302 and Coreware® Intellectual Property (IP) 304 are represented by gate level netlists. Further, a clock source 305 is connected to a point A 306 and a point B 308. Although the clock source 305 is illustrated in FIG. 3 as being defined within the Coreware® IP, it is contemplated that the source may also be located outside of the Coreware® IP. Using a static timing analysis tool such as Primetime®, the path between point A 306 and point B 308 may be timed. Such path may have clock delay 1 310 in common for the time to the clock pin on A 306 and B 308. In such configuration, the delay value is different to point A 306 as to point B 308 because of delay derating methodology. In order to compensate for this, CRPR is employed. CRPR calculates the delay between A 306 and B 308 and then, relays such value to the user.

In an additional embodiment, the gate level netlists included within Coreware® Intellectual Property (IP) 304 are non-accessible and an ETM (e.g., .lib/.synlib models) is employed. The ETM may include timing arcs between the input and output pins as well as internal pins. For example, an exemplary ETM includes a timing clock at define point A 314 and a timing clock at define point B 316. Such configuration generates a number of timing arcs. A timing arc is generated from the define point A 314 internal pin to define point B 316, from define point B 316 to DATAOUT pin 317, and from define point B 316 to CLOCKOUT pin 318 of the Coreware®. A second timing arc is generated from the define point A 314 and the define point B 316. The timing arc between define point A 314 and point B 316 may be used to calculate CRPR because such arc is the common arc.

It is contemplated that additional embodiments of the present invention may include generating ETMs with ideal clocks, analyzing the Coreware® IP using propagated clocks and determining the amount of clock delay present within the path, or creating a script to edit the ETM model in which new clock only timing arcs are added and generated clock definitions represent the analyzed delay between the clocks which are clocking data within the core and outside of the core.

It is to be noted that the foregoing described embodiments according to the present invention may be conveniently implemented using conventional general purpose digital computers programmed according to the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is to be understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for enabling clock reconvergence pessimism removal (CRPR) in an extracted timing model (ETM), the method comprising:
    locating a plurality of clocks defined within a core;
    determining if one of the plurality of clocks are clocking data both within the core and outside of the core, said determining if one of the plurality of clocks are clocking data both within the core and outside of the core comprising:
        connecting input pins with input ports and output pins with output ports;
        defining standard time constraints and chip level constraints;
        applying global timing derating;
        activating a CRPR algorithm; and
        generating a timing report on each of the output ports;
    generating a CRPR clock for an output pin of a last cell in a clock path common to an internal register clock pin and one of the plurality of clocks clocking data both within the core and outside of the core; and
    utilizing a static timing analysis tool to calculate the CRPR from the CRPR clock.

2. The method as claimed in claim 1, wherein the method is performed by Coreware Intellectual Property (IP).

3. The method as claimed in claim 1, wherein the static timing analysis tool is a gate-level static timing analysis tool.

4. The method as claimed in claim 1, wherein the CRPR clock uses a hard macro input clock pin as its master clock.

5. The method as claimed in claim 1, further comprising searching each timing report for clock reconvergence pessimism.

6. The method as claimed in claim 5, further comprising identifying a data port on which CRPR is being used, CRPR is being used on a data port when clock reconvergence pessimism is detected as a non-zero value.

7. The method as claimed in claim 6, further comprising identifying a clock coupled with the data port on which CRPR is being used.

8. A computer-readable medium having computer-executable instructions for performing a method for enabling clock reconvergence pessimism removal (CRPR) in an extracted timing model (ETM), the method comprising:
    locating a plurality of clocks defined within a core;
    determining if one of the plurality of clocks are clocking data both within the core and outside of the core, said determining if one of the plurality of clocks are clocking data both within the core and outside of the core comprising:
        connecting input pins with input ports and output pins with output ports;
        defining standard time constraints and chip level constraints;
        applying global timing derating;
        activating a CRPR algorithm; and
        generating a timing report on each of the output ports;
    generating a CRPR clock for an output pin of a last cell in a clock path common to an internal register clock pin and one of the plurality of clocks clocking data both within the core and outside of the core; and
    utilizing a static timing analysis tool to calculate the CRPR from the clock delay information.

9. The computer-readable medium as claimed in claim 8, wherein the method is performed by Coreware Intellectual Property (IP).

10. The computer-readable medium as claimed in claim 8, wherein the static timing analysis tool is a gate-level static timing analysis tool.

11. The computer-readable medium as claimed in claim 8, wherein the CRPR clock uses a hard macro input clock pin as its master clock.

12. The computer-readable medium as claimed in claim 8, further comprising identifying a data port on which CRPR is being used, CRPR is being used on a data port when clock reconvergence pessimism is detected as a non-zero value.

13. The computer-readable medium as claimed in claim 8, further comprising identifying a clock coupled with the data port on which CRPR is being used.

* * * * *